United States Patent [19]

Hederich et al.

[11] 4,036,862

[45] July 19, 1977

[54] 1-AMINO-2-(BROMOPHENOXY-ALKOXY)-4-HYDROXY ANTHRAQUINONE DYESTUFFS

[75] Inventors: Volker Hederich, Cologne; Hans-Samuel Bien, Burscheid; Günter Gehrke, Cologne, all of Germany

[73] Assignee: Bayer Aktiengesellschaft, Leverkusen, Germany

[21] Appl. No.: 618,247

[22] Filed: Sept. 30, 1975

[30] Foreign Application Priority Data

Oct. 5, 1974 Germany .............................. 2447610
May 30, 1975 Germany .............................. 2524126

[51] Int. Cl.$^2$ ............................................. C07C 97/26
[52] U.S. Cl. ................................ 260/380; 260/381; 260/383
[58] Field of Search ............................... 260/380, 381

[56] References Cited

U.S. PATENT DOCUMENTS

| | | | |
|---|---|---|---|
| 2,972,622 | 2/1961 | Grossmann | 260/380 |
| 2,992,240 | 7/1961 | Lodge | 260/380 |
| 3,264,325 | 8/1966 | Lewis | 260/380 |
| 3,642,835 | 2/1972 | Hederich et al. | 260/380 X |
| 3,798,239 | 3/1974 | Genta | 260/380 |
| 3,836,549 | 9/1974 | Yamada | 8/40 X |
| 3,929,401 | 12/1975 | Kröck et al. | 260/380 X |

FOREIGN PATENT DOCUMENTS

| | | | |
|---|---|---|---|
| 1,644,516 | 10/1969 | Germany | 260/380 |
| 44-12039 | 5/1969 | Japan | 260/380 |
| 1,093,863 | 12/1967 | United Kingdom | 260/380 |

*Primary Examiner*—Daniel E. Wyman
*Assistant Examiner*—Thomas A. Waltz
*Attorney, Agent, or Firm*—Plumley and Tyner

[57] ABSTRACT

The invention relates to mixtures of water-insoluble anthraquinone dyestuffs of the formula

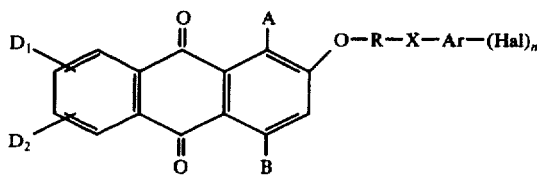

in which
A and B are amino or hydroxyl
R is alkylene
X is a direct bond, oxygen, sulphur or imino
Ar is aryl
$D_1$ and $D_2$ are hydrogen or halogen,
Hal represents chlorine or preferably bromine and
n represents on average a number from 0.1 to 2.5.

The preferred variant for the preparation of the dyestuffs (wherein Hal represents bromine) is characterized in that anthraquinone compounds of the formula

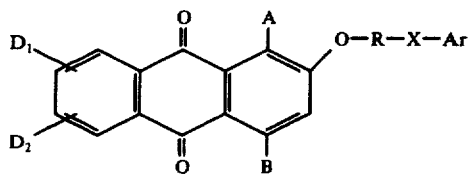

are brominated on the aryl radical Ar.

The dyestuffs are outstanding suitable for the dyeing of polyester fibers.

4 Claims, No Drawings

1-AMINO-2-(BROMOPHENOXY-ALKOXY)-4-HYDROXY ANTHRAQUINONE DYESTUFFS

The present invention relates to mixtures of anthraquinone dyestuffs, which are insoluble in water, of the formula

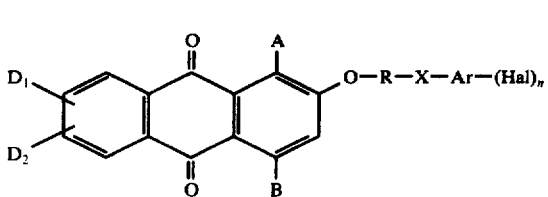

(I)

in which
A and B represent an amino or hydroxyl group,
R represents an alkylene radical which is optionally substituted and/or interrupted by oxygen,
X represents a direct bond, oxygen, sulphur or an imino group which is optionally substituted by alkyl groups.
Ar represents an optionally substituted aryl radical,
$D_1$ and $D_2$ represent hydrogen or halogen,
Hal represents chlorine or bromine and
n represents on average a number from 0.1 to 2.5,
and to their preparation and use for dyeing and/or printing synthetic fiber materials.

Suitable alkylene radicals are $C_2-C_{10}$ alkylene radicals which are optionally substituted by $C_1-C_3$ alkyl, hydroxyl, tolyloxy or phenoxy and which can be interrupted by O. The alkylene radical can preferably contain 1 or 2 such substituents. Suitable alkylimino groups are those with 1 to 4 C atoms in the alkyl radical.

Suitable halogen atoms $D_1$ and $D_2$ are chlorine and fluorine, which are preferably in the 6-position and/or 7-position.

Suitable radicals Ar are phenyl groups, which can be monosubstituted to disubstituted by chlorine, $C_1-C_8$-alkyl, $C_1-C_4$ alkoxy or $C_1-C_4$-alkylmercapto radicals or by hydroxyl, hydroxyalkyl, dihydroxypropyl, hydroxyalkoxy, trifluoromethyl, phenyl, phenoxy, benzyl or benzyloxy groups, and also α-or β-naphthyl, tetrahydronaphthyl, 2- or 3-diphenyleneoxidyl, dihydroxymethylenephenyl or dimethylcumaranyl radicals. Phenyl radicals, which are optionally monosubstituted, are preferred. Examples which may mentioned are: phenyl, tolyl, ethylphenyl, n- and i-propylphenyl, n- and t-butylphenyl, n-pentylphenyl, n-octylphenyl, chlorophenyl, fluorophenyl, trifluoromethylhenyl, cresyl, chloromethyl-phenyl, anisyl, isopropoxyphenyl as well as

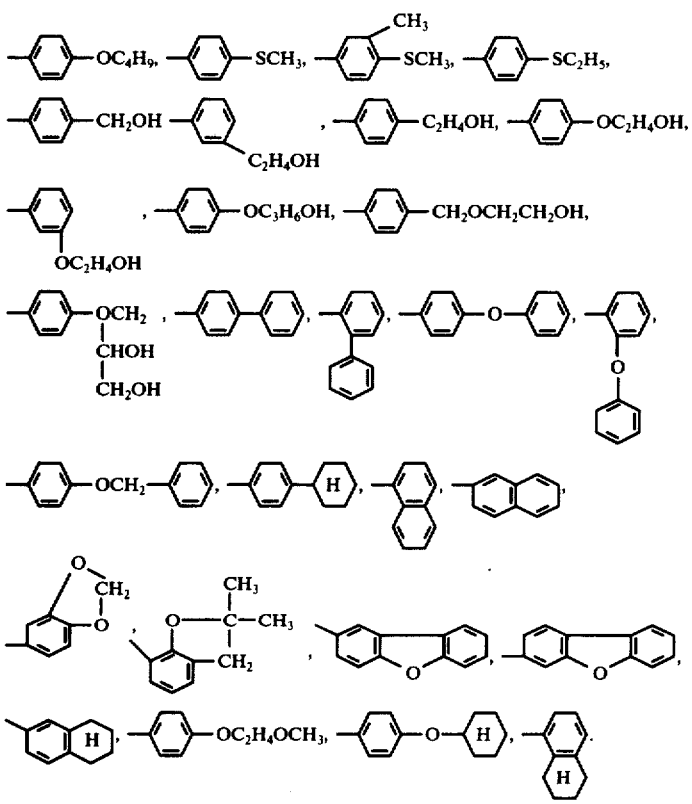

The dyestuffs repared according to the invention are preferably mixtures of compounds of the formula I with n = 0, 1 and 2, the other radicals being identical. The most favourable coloristic properties are achieved with those dyestuffs in which the aryl nucleus Ar contains 0.1 to 1.5, preferably 0.2 to 0.6, bromine atoms or 0.1 to 1.5, preferably 0.2 - 0.8, chlorine atoms per dyestuff molecule. Compared with the non-halogenated compounds, the dyestuff mixtures I are distinguished by better affinity or better fastness to sublimation and compared with the defined halogen-containing anthraquinone dyestuffs, such as are described, for example, in Japanese Published Specifications 64,05,967, 65,53,950 and 63,08,498 or in U.S. Pat. No. 3,787,177, they are distinguished by improved build-up capacity and greater depth of colour. Moreover, the anthraquinone dyestuffs I prepared according to the invention have the advantage of being more economical to prepare than corresponding defined halogen-containing compounds, since they are generally obtainable from cheaper starting materials.

Preferred compounds of the indicated formula I are those in which A denotes an amino group, B denotes an amino or hydroxyl group and $D_1$ and $D_2$ denote hydrogen and of these compounds, in turn, those which are preferred are compounds in which X represents oxygen or a direct bond.

Particularly preferred dyestuff mixtures I are furthermore, those in which A denotes an amino group, B denotes a hydroxyl group, $D_1$ and $D_2$ denote hydrogen and Ar denotes a phenyl radical which is optionally monosubstituted to disubstituted by $C_1$-$C_8$-alkyl radicals and of these, in turn, those compounds in which X denotes oxygen or a direct bond and R denotes a straight-chain or branched $C_2$-$C_8$-alkylene radical are of particular interest.

Anthraquinone dyestuff mixtures of very particular interest are those of the formula

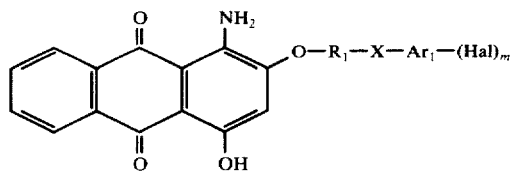

II in which
$R_1$ represents a straight-chain $C_2$-$C_6$-alkylene radical, preferably $C_2H_4$,
X represents a direct bond or preferably oxygen,
$Ar_1$ represents a phenyl radical, which is optionally monosubstituted to disubstituted by a $C_1$-$C_4$- (preferably $C_1$-$C_2$-) alkyl radical,
Hal represents bromine and
$m$ represents 0.2 to 0.8.

Insofar as the abovementioned alkyl radicals are branched, these are preferably in the p-position of the phenyl radical.

The preparation of the dyestuff mixtures according to the invention is carried out in a manner which is in itself known by, for example, reacting compounds of the formula

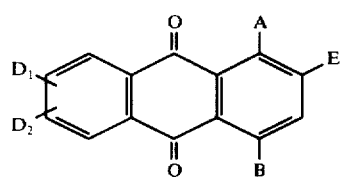

III wherein
A, B, $D_1$ and $D_2$ have the abovementioned meaning and
E represents an exchangeable substituent, with compounds of the formula

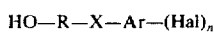

wherein

R, X, Ar, Hal and $n$ have the abovementioned meaning, at elevated temperatures in the presence of basic compounds and optionally in the presence of an organic solvent. Reactions of this type are described, for example, in British patent specification No. 974,404 or in U.S. Pat. Nos. 3,124,601 and 2,992,240.

Suitable exchangeable substituents are: halogen, such as chlorine and bromine, lower alkoxy groups, especially the methoxy group, optionally substituted aryloxy groups, preferably phenoxy groups, or sulphonic acid groups.

Examples of suitable organic solvents are: dimethylformamide, dimethylacetamide, dimethylsulphoxide, N-methylpyrrolidone, ε-caprolactam, tetramethylenesulphone or pyridine.

Suitable basic compounds are sodium hydroxide or potassium hydroxide, sodium carbonate or potassium carbonate, or organic bases, such as trimethylamine, triethylamine or benzyltrimethylammonium hydroxide.

Suitable anthraquinone compounds with exchangeable substituents which may be mentioned in particular are: 1-amino-4-hydroxy-2-phenoxy-anthraquinone, 1-amino-4-hydroxy-2-(p-chlorophenoxy)-anthraquinone, 1-amino-4-hydroxy-anthraquinone-2-sulphonic acid, 1-amino-4-hydroxy-2-bromo-anthraquinone, 1-amino-4-hydroxy-5-(6-,7- or 8-)chloro-2-phenoxy-anthraquinone, 1-amino-4-hydroxy-6-(or 7-)fluoro-2-phenoxy-anthraquinone, 1,4-diamino-2-phenoxy-anthraquinone and 1,4-dihydroxy-2-phenoxy-anthraquinone.

The hydroxy compounds IV are accessible by bromination or chlorination, optionally in the presence of inert organic solvents, for example according to the instructions in C.r. 196 (1933) 622 and A.ch. (11) (1934) 418. Examples of suitable compounds which may be mentioned are: phenoxyethanol, cresoxyethanol, dimethylphenoxyethanol, phenoxypropanol, phenoxybutanol, hydroxyethylaniline, glycerol monophenyl ether, glycerol diphenyl ether, phenylethanol, phenylpropanol and phenoxyhexanol, which are brominated or chlorinated in each case.

A further process for the preparation of the dyestuffs according to the invention is to react anthraquinone compounds of the formula

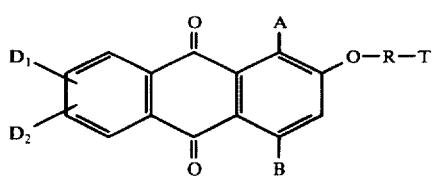

V wherein
A, B, R, $D_1$ and $D_2$ have the indicated meaning and T represents chlorine, bromine or an arylsulphonyl or alkanesulphonyloxy group, preferably a methanesulphonyloxy group,
with compounds of the formula

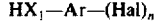

wherein
Ar, Hal and $n$ have the indicated meaning and
$X_1$ represents oxygen, sulphur or an amino group which is optionally substituted by alkyl groups, at elevated temperatures in the presence of basic compounds and optionally in the presence of an organic solvent, say according to the instructions of British patent specification No. 835,819.

Suitable arylsulphonyloxy or alkanesulphonyloxy groups are: the bensenesulphonyloxy, toluenesulphonyloxy, methanesulphonyloxy, ethanesulphonyloxy, propanesulphonyloxy and the butanesulphonyloxy groups.

The anthraquinone compounds V required for reactions of this type are in turn obtained according to the instructions of GB No. 870,948 and No. 1,195,151.

Suitable basic compounds are: alkali metal hydroxides, such as sodium hydroxide or potassium hydroxide, alkali metal carbonates, such as sodium carbonate or potassium carbonate, alkali metal acetates, such as sodium acetate or potassium acetate, and also organic bases, such as trimethylamine or triethylamine or benzyltrimethylammonium hydroxide.

Suitable solvents are: formamide or dimethylformamide, dimethylacetamide, N-methylpyrrolidone, ε-caprolactam, dimethylsulphoxide, tetramethylenesulphone or pyridine.

Dyestuff mixtures of the formula I are furthermore obtainable by reacting anthraquinone compounds of the formula

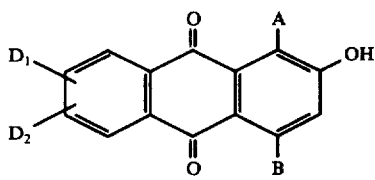

VII wherein

A, B, $D_1$ and $D_2$ have the abovementioned meaning, with compounds of the formula , U—R—X—Ar—(Hal)$_n$  VIII wherein R, X, Ar, Hal and $n$ have the indicated meaning and
U represents chlorine, bromine or the phenyl or p-methylphenylsulphonyloxy radical, at elevated temperatures in the presence of basic compounds and an organic solvent, say according to the instructions of Japanese Published Specification No. 65,53,950 or of DAS (German Published Specification) No. 2,316,291.

A common feature of the processes mentioned for the preparation of the dyestuff mixtures I, according to the invention, is that it was not to be expected from the start that halogen-containing compounds of the formula IV, VI or VIII lead, after reaction with the particular anthraquinone compounds III, V or VII, to halogen-containing dyestuffs I with a corresponding halogen content since it could very well be possible for individual components from the mixtures employed to enter preferably into the reaction.

The preferred variant for the preparation of anthraquinone dyestuffs of the formula I wherein Hal represents bromine is characterised in that anthraquinone compounds of the formula (IX)

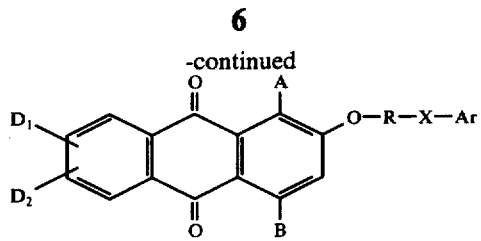

in which
A and B represent an amino or hydroxyl group,
R represents an alkylene radical which is optionally substituted and/or interrupted by oxygen,
X represents a direct bond, oxygen, sulphur or an imino group which is optionally substituted by alkyl groups,
Ar represents an optionally substituted aryl radical and
$D_1$ and $D_2$ represent hydrogen or halogen,
are brominated on the aryl radical Ar.

The bromination of the aryl radicals in compounds of the formula IX is carried out according to methods which are in themselves known (compare, for example, British patent specification No. 979,567).

The process according to the invention can be carried out, for example, by introducing the anthraquinone compound of the formual IX into water, dilute sulphuric acid, dilute or concentrated hydrogen halide acid, preferably into concentrated hydrochloric acid, or into organic solvents, such as, for example, chlorobenzenes or nitrobenzenes, glacial acetic acid or chlorinated hydrocarbons and then adding, preferably, bromine or a compound having a brominating action, such as are described, for example, in Houben-Weyl, Methoden der organischen Chemie (Methods of Organic Chemistry), volume 5/4, page 13–37.

The bromination is carried out at temperatures between 0° and 100° C, preferably at room temperature up to 90° C, it being possible, if necessary, to add boric acid or the catalysts customarily used in brominations, such as iodine, to the reaction mixture.

The bromination products prepared according to the process of the invention are preferably mixtures of non-brominated starting material as well as mono-brominated and di-brominated reaction products and those dyestuffs in which 0.2 to 0.6 bromine atom have been taken up per dyestuff molecular IX have the most favourable coloristic properties. However, it is of course also possible to prepare mixtures of this type by mechanical mixing of non-brominated compounds and defined bromine compounds.

Preferred compounds of the indicated formula IX, which are brominated according to the invention, are those in which A denotes an amino group, B denotes an amino or hydroxyl group and $D_1$ and $D_2$ denote hydrogen and of these compounds, in turn, those which are particularly preferred are compounds in which X represents oxygen or a direct bond.

Particularly preferred starting compounds IX for the process according to the invention are furthermore those in which A denotes an amino group, B denotes a hydroxyl group and $D_1$ and $D_2$ denote hydrogen and of these compounds, in turn, those which are particularly preferred are compounds in which X represents oxygen or a direct bond.

Particularly preferred starting compounds IX for the process according to the invention are furthermore those in which A denotes an amino group, B denotes a hydroxyl group, $D_1$ and $D_2$ denote hydrogen and Ar denotes a phenyl radical which is optionally monosubstituted to disubstituted by $C_1$-$C_8$-alkyl radicals, and of these, in turn, those compounds in which X denotes oxygen or a direct bond and R denotes an optionally substituted $C_2$-$C_8$-alkylene radical are of particular interest.

Compounds of very particular interest as starting materials (IX) to be used according to the invention are those of the formula

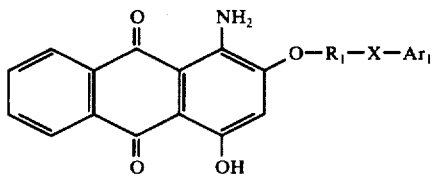

(X)

in which $R_1$ represents a straight-chain $C_2$-$C_6$-(preferably $C_2$-$C_4$-) alkylene radical, X represents oxygen or a direct bond and $Ar_1$ represents a phenyl radical, which is optionally monosubstituted to disubstituted by a $C_1$-$C_4$-alkyl radical, preferably a $C_1$-$C_2$-alkyl radical, the statements made above being valid for branched alkyl radicals.

The starting compounds of the formula IX which are required for the preparation of the dystuffs according to the invention are obtained according to processes which are in themselves known, for example by reaction of 1-amino-4-hydroxyanthraquinones or 1,4-dihydroxyanthraquinones, which carry an exchangeable aryloxy or sulphonic acid group in the 2-position, with alcohols of the formula $$HO - R - X - Ar \qquad (XI)$$

in which

R, X and Ar have the abovementioned meaning, in the presence of alkaline condensing agents and optionally in the presence of solvents.

Examples of suitable alcohols XI are: phenylethanol, phenylpropanol, phenoxyethanol, cresoxyethanol, dimethylphenoxyethanol, phenoxypropanol, phenoxybutanol, hydroxyethylaniline, glycerol monophenyl ether and glycerol diphenyl ether.

As mentioned above, the dyestuffs prepared according to the process of the invention are in most cases dyestuff mixtures. However, it is also possible, by means of controlled reaction conditions and/or specific purification operations, to prepare defined monobrominated and dibrominated compounds. Whilst the latter have in general not been described hitherto, the new compounds in the case of the monobrominated compounds are those dyestuffs of the formula I wherein A and B have the same meaning. If, in formula I, A represents an amino group and B represents a hydroxyl group, those defined monobrominate dyestuffs in which R represents a straight-chain or branched $C_3$-$C_{10}$-alkylene radical, X represents oxygen, a direct bond or an amino group which is optionally substituted by $C_1$-$C_4$-alkyl groups and Ar represents phenyl which is optionally substituted by 1 to 3 $C_1$-$C_4$-alkyl groups are new.

These new compounds are also a subject of the present invention.

Synthetic fibre materials which are dyed with the dyestuffs prepared according to the invention are, above all, those based on polyesters, such as polyethylene terephthalate or polycyclohexanedimethylene terephthalate, heterogeneous polyesters obtained from terephthalic acid, sulphoisophthalic acid and ethylene glycol, or copolyether esters obtained from 4-hydroxybenzoic acid and ethylene glycol, cellulose triacetate or celluloe 2½-acetate, synthetic polyamides, such as hexamethylenediamine adipate, poly-ε-caprolactam or ω-aminoundecanoic acid, polyurethanes, polyacrylonitrile, polyolefines or polycarbonates, for example obtained from 2,2-bis-(hydroxyphenyl)-propane.

The fibre materials can be in the most diverse stages of processing, for example as filaments, flocks or tops or as piece goods, such as woven fabrics or knitted fabrics or as made-up goods.

Dyeing and printing can be carried out according to processes which are in themselves known for dyeing from an aqueous liquor. It is advantageous to bring the dyestuffs or the dyestuff mixtures into a finely divided state before use, according to customary methods.

When dyeing fibres made from aromatic polyesters, for example polyethylene glycol terephthalate, it is possible to add the customary carriers to the aqueous dyebath or to carry out the dyeing without the addition of a carrier at 120°-145° C under pressure. When dyeing by the thermosol method, the printed or padded fibre materials, if appropriate after an intermediate drying, are heated briefly to temperatures of 180°-240° C. In general, the heat treatment is carried out for periods of from 30 seconds to 2 minutes.

Cellulose triacetate, celluloe 2½-acetate and polyamide fibres can be dyed from aqueous liquors at about 100° C, optionally in the presence of the customary auxiliaries. Dyeing of blended fabrics made from polyester fibres and cellulose fibres, such as cotton, by the thermosol method, which has been mentioned, also leads to excellent results. In this case dystuffs suitable for dyeing cotton, such as vat dyestuffs or reactive dyestuffs, are also added, in addition to the dyestuffs prepared according to the invention, to the padding liquor.

Some type of dyestuffs prepared according to the invention, especially those which, due relatively long alkyl chains, have a minimum solubility in tetrachloroethylene of 5 g/l (preferably 10 g/l) are also suitable for dyeing synthetic fibre materials from organic solvents by the so-called continuous method.

The dyeing conditions suitable for this are known and have been described in more detail, for example, in Belgian Patent Specification No. 753,315.

Using the dyestuffs prepared according to the invention, deep orange, red or violet dyeings or prints with good fastness properites, especially good fastness to light and sublimation, are obtained by the abovementioned process on the said fibres.

EXAMPLE 1

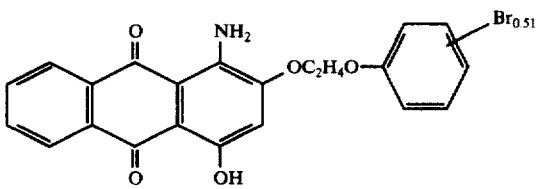

a. 111 g of brominated phenoxyethanol (obtained by bromination of 100 g of 2-phenoxyethanol-1 with 22 g of bromine in 100 ml of concentrated hydrochloric acid) are heated with 8 g of anhydrous potassium carbonate for 1½ hours at 150° C. After introducing 32 g of 1-amino-2-phenoxy-4-hydroxy-anthraquinone, the mixture is stirred for 10 hours at 150° C, cooled to 70° C and diluted with 100 ml of methanol and after cooling the precipitate is filtered off and washed with 50 ml of methanol and hot water. After drying, 33.5 g of dyestuff mixture with a bromine content of 9.0% are obtained.

b. If the same reaction is carried out with a brominated phenoxyethanol, which is obtained by the action of 19 g of bromine on 50 g of phenoxyethanol without further diluent, a dyestuff with 8.1% of bromine is obtained.

c. Using 1 g of the dyestuff mixture prepared according to Example 1a, which has previously been finely dispersed in the presence of dispersing agents, 100 g of polyethylene terephthalate fibres are dyed in 4 l of H$_2$O at 100° C and pH 4.5 in the presence of 15 g of o-cresotic acid methyl ester as the carrier. A brilliant yellowish-tinged pink dyeing, which is distinguished by very good build-up and high fastness to washing, thermofixing, abrasion and light, is obtained. A similar dyeing is obtained when the polyester fibres used are those obtained from 1,4-bis-(hydroxymethyl)-cyclohexane and terephthalic acid.

d. Using 1 g of the dyestuff mixture mentioned in Example 1a), which has previously been finely dispersed with the customary auxiliaries, 100 g of polyester fibres (polyethylene terephthalate) are dyed in 3 l of water for 1 hour at 125° - 130° C under pressure. A clear deep red dyeing of good fastness properties is obtained.

e. Using 1 g of the dyestuff mixture mentioned in Example 1a), which has previously been finely dispersed according to the customary methods, 100 g of polyamide fabric are dyed in 4 l of water for 1 hour at 100° C. The fabric is then rinsed warm and cold and dried. A clear pink dyeing of very good fastness to washing and light is obtained.

Polyurethane fibres can be used in place of polyamide fibres with equal success.

f. A dyebath is prepared using 1 g of the dyestuff mixture prepared according to Example 1a), which has previously been finely dispersed using the auxiliaries customary for this purpose, 6 g of fatty alcohol sulphonate and 3 l of water, and 100 g of cellulose triacetate fibres are dyed in this bath for 1 hour at 100° C. A yellowish-tinged red dyeing of very good fastness to washing, thermofixing, abrasion and light is obtained.

g. 20 g of cellulose 2½-acetone fibres are dyed for 1 hour at 75° in a liquor consisting of 600 ml of water, 1 g of Marseille soap and 0.2 g of the dyestuff mixture mentioned in Example 1a), which has been finely dispersed. A brilliant pink dyeing with good fastness to abrasion, light and water is obtained.

EXAMPLE 2

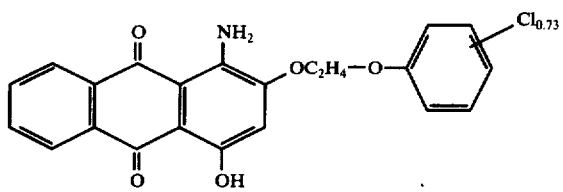

a. 160 g of chlorinated phenoxyethanol (prepared by passing chlorine into phenoxyethanol at 25° C), 12 g of anhydrous potassium carbonate and 40 g of 1-amino-2-phenoxy-4-hydroxyanthraquinone are heated for 10 hours at 150° - 160° C. After adding 200 ml of methanol and 10 ml of glacial acetic acid, the dyestuff mixture is filtered off, washed with 100 ml of methanol and warm water and dried. 41.4 g of a dyestuff with a chlorine content of 6.3% are obtained.

b. 1 g of the dyestuff mixture which has been prepared in this way, and finely dispersed, is introduced into a dyebath which contains 100 g of polyester fibres (polyethylene terephthalate) in 3 l of water. Dyeing is carried out for 1 hour at 125° - 130° C under pressure and a clear, deep, yellowish-tinged red dyeing of very good fastness properties is obtained.

EXAMPLE 3

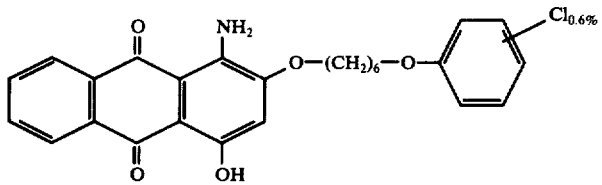

a. 8.4 g of 1-amino-4-hydroxy-2-(ω-bromohexoxy)-anthraquinone (prepared from the ω-hydroxyhexoxy compound with boiling 48% strength hydrobromic acid) are warmed in 60 ml of N-methylpyrrolidone with a mixture consisting of 1.17 g of phenol, 0.8 g of o-chlorophenol, 0.8 g of p-chlorophenol and 1 g of powdered sodium hydroxide for 2½ hours at 70° - 80° C. After adding 80 ml of methanol and a little glacial acetic acid, the dyestuff mixture is filtered off, washed with methanol and water and dried. 5.6 g of dyestuff with a chlorine content of 4.7% are obtained.

b. If the 8.4 g of 1-amino-4-hydroxy-2-(ω-bromohexoxy)-anthraquinone are replaced by 8.7 g of 1-amino-4-hydroxy-2-(ω-mesyloxyhexoxy)-anthraquinone, a dyestuff mixture of the indicated formula is obtained analogously.

c. A pre-cleaned and thermofixed fabric of polyethylene terephthalate is printed with a paste consisting of the following components: 20 g of the dyestuff prepared according to Example 3a) and finely dispersed, 520 g of water, 450 g of crystal gum 1:2 and 10 g of cresotic acid methyl ester.

An alginate thickener can also be used in place of crystal gum. In order to fix the dyestuff, the printed and dried goods are treated with hot air at 200° C or are passed, at 190° - 200°C, over a high capacity stenter frame or through a condensing apparatus. The period of action is 30 - 60 seconds. The resulting fixed print is then rinsed cold, soaped with 1-2 g/l of anionic washing agent at 70° – 80° C for about 10 minutes, rinsed first hot and then cold and dried. A clear red print of very good fastness to light and sublimation is obtained.

A brilliant pink print is obtained in a similar manner when cellulose triacetate, polyamide or polyurethane fibres are employed in place of polyethylene terephthalate fibres.

EXAMPLE 4

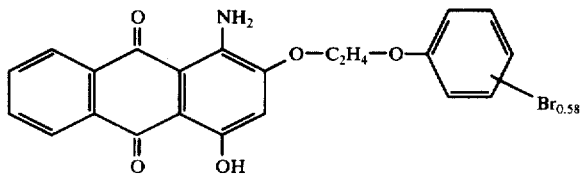

5.1 g of 1-amino-2,4-dihydroxy-anthraquinone, 2.2 g of anhydrous sodium carbonate, 6.5 g of brominated p-toluenesulphonic acid β-phenoxyethyl ester (Br = 16.3%, prepared by bromination in carbon tetrachloride at room temperature) and 40 ml of anhydrous nitrobenzene are heated for 3 hours at 150° – 160° C. The mixture is allowed to cool and is diluted with 50 ml of methanol and the dyestuff mixture is filtered off.

After washing and drying, 5.6 g of a dyestuff which has a bromine content of 10.2% and which dyes polyester materials in clear red shades are obtained.

b. If the 5.1 g of 1-amino-2,4-dihydroxy-anthraquinone are replaced by 5.1 g of 1-amino-3,4-dihydroxy-anthraquinone, 5.8 g of the isomeric dyestuff mixture, which contains 9.8% of bromine and which dyes polyester materials in fast bluish-tinged red shades, are obtained analogously.

EXAMPLE 5

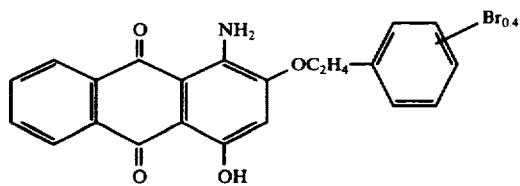

9 g 1-amino-2,4-dihydroxy-anthraquinone are dissolved in 50 ml of N-methylpyrrolidone. After adding 4 g of anhydrous potassium carbonate and 12 g of brominated phenylethyl bromide (bromine content 45%), the reaction mixture is heated at 130° C for 2½ hours. It is then diluted with 50 ml of methanol and the dyestuff mixture which has separated out is filtered off and washed with methanol and water. 13.2 g of a dyestuff mixture which has a bromine content of 7.3% and which does polyester materials in fast yellowish-tinged red shades are obtained.

EXAMPLE 6

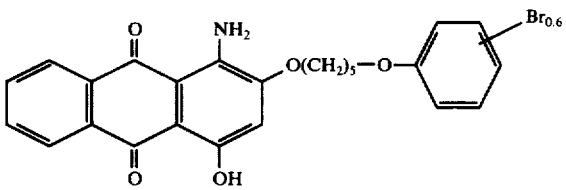

8.4 g of 1-amino-4-hydroxy-2-(ω-bromopentoxy)-anthraquinone (obtained from the sulpho-ester of 1-amino-4-hydroxy-2-(ω-hydroxypentoxy)-anthraquinone and hydrobromic acid) are introduced into a mixture consisting of 60 ml of N-methylpyrrolidone, 2.15 g of brominated phenol with a bromine content of 33% (obtained according to the instructions in Organische Synthesen (Organic Syntheses) I, page 122 by bromination in carbon tetrachloride), 1.17 g of phenol and 1 g of powdered sodium hydroxide and the mixture is warmed at 70° – 80° C for 4 hours. After cooling, the mixture is diluted with 80 ml of methanol and a little glacial acetic acid and the dyestuff mixture which has separated out is filtered off and washed with methanol and water. 7.8 g of a dyestuff which has a bromine content of 9.6% and which dyes polyester materials in fast red shades are obtained.

EXAMPLE 7 – 45

The dyestuff mixtures which are listed in Table 1, which have the halogen contents indicated in column 6 and which give the shades indicated in column 7 on polyester materials are obtained analogously to the instructions in Examples 1 – 6.

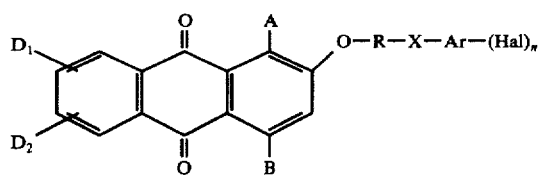

Table 1

| Example | D1 | D2 | A | B | O—R—X—Ar—(Hal)n | Colour shade on Polyester |
|---|---|---|---|---|---|---|
| 7 | H | H | NH2 | OH | OC$_2$H$_4$O—⟨⟩—Br$_{0.6}$ | yellowish-tinged red |
| 8 | H | H | NH2 | OH | OC$_2$H$_4$O—⟨⟩—Br$_{1.1}$ | yellowish-tinged red |

Table 1-continued

| Example | D1 | D2 | A | B | O—R—X—Ar—(Hal)n | Colour shade on Polyester |
|---|---|---|---|---|---|---|
| 9 | H | H | NH2 | OH | $OC_2H_4O$—phenyl(CH$_3$)(Br$_{0.3}$) | yellowish-tinged red |
| 10 | H | H | NH2 | OH | $OC_2H_4O$—phenyl(Br$_{0.4}$)(C$_2$H$_5$) | yellowish-tinged red |
| 11 | H | H | NH2 | OH | $OC_2H_4O$—phenyl(Br$_{0.2}$)(OCH$_3$) | yellowish-tinged red |
| 12 | H | H | NH2 | OH | $OC_2H_4O$—phenyl(cyclohexyl)(Cl$_{0.8}$) | yellowish-tinged red |
| 13 | H | H | NH2 | OH | $OC_2H_4NH$—phenyl(Cl$_{0.6}$) | pink |
| 14 | H | H | NH2 | OH | $OC_3H_6$—phenyl(Br$_{0.3}$) | yellowish-tinged red |
| 15 | H | H | NH2 | OH | $O(CH_2—CH_2O)_2$—phenyl(Br$_{0.4}$) | yellowish-tinged red |
| 16 | H | H | NH2 | OH | $O(CH_2—CH_2O)_3$—phenyl(Br$_{0.8}$) | yellowish-tinged red |
| 17 | H | H | NH2 | OH | $OC_4H_8O$—phenyl(Br$_{0.7}$) | yellowish-tinged red |
| 18 | H | H | NH2 | OH | $OC_5H_{10}O$—phenyl(Cl$_{0.6}$) | yellowish-tinged red |
| 19 | H | H | NH2 | OH | $OCH_2$—CH(CH$_3$)—O—phenyl(Br$_{0.3}$) | pink |
| 20 | H | H | OH | NH2 | $OCH_2$—CH(OH)—CH$_2$—O—phenyl(Br$_{0.4}$) | pink |
| 21 | H | H | OH | NH2 | $OCH_2$—C(CH$_3$)$_2$—CH$_2$—O—phenyl(Br$_{0.7}$) | yellowish-tinged red |
| 22 | 5-Cl | H | NH2 | OH | $OC_2H_4O$—phenyl(Br$_{0.6}$) | bluish-tinged red |
| 23 | 6-Cl | H | NH2 | OH | $OC_2H_4$—S—phenyl(Br$_{0.3}$) | bluish-tinged red |

Table 1-continued

| Example | D1 | D2 | A | B | O—R—X—Ar—(Hal)n | Colour shade on Polyester |
|---|---|---|---|---|---|---|
| 24 | 7-Cl | H | NH2 | OH | 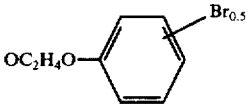 | bluish-tinged red |
| 25 | 8-Cl | H | NH2 | OH | 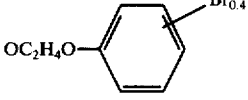 | bluish-tinged red |
| 26 | 6-F | 7-F | NH2 | OH | 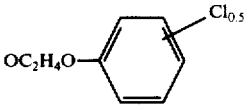 | bluish-tinged red |
| 27 | 6-Cl | 7-Cl | NH2 | OH | 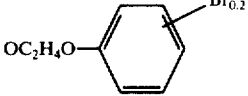 | bluish-tinged red |
| 28 | H | H | OH | OH | 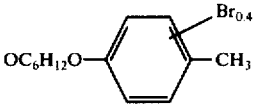 | orange |
| 29 | H | H | OH | OH | 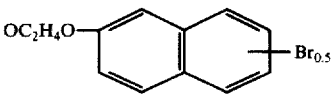 | orange |
| 30 | H | H | OH | OH | 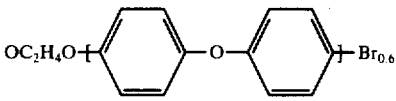 | orange |
| 31 | H | H | OH | OH | 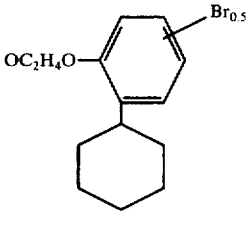 | orange |
| 32 | H | H | OH | OH | 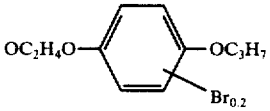 | orange |
| 33 | H | H | NH2 | NH2 | 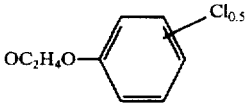 | violet |
| 34 | H | H | NH2 | NH2 | 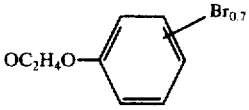 | violet |
| 35 | H | H | NH2 | OH | 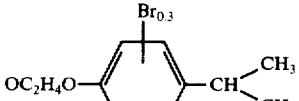 | yellowish-tinged red |
| 36 | H | H | NH2 | OH | 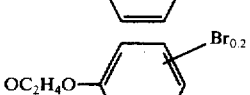 | yellowish-tinged red |
| 37 | H | H | NH2 | OH | 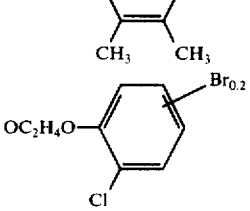 | yellowish-tinged red |

Table 1-continued

| Example | D1 | D2 | A | B | O—R—X—Ar—(Hal)n | Colour shade on Polyester |
|---|---|---|---|---|---|---|
| 38 | H | H | NH2 | OH | $OC_2H_4O$—⟨phenyl⟩—$SCH_3$, $Br_{0.3}$ | yellowish-tinged red |
| 39 | H | H | NH2 | OH | $OC_3H_6O$—⟨phenyl⟩—$Cl_{0.5}$ | yellowish-tinged red |
| 40 | H | H | NH2 | OH | $OC_4H_8O$—⟨phenyl⟩—$CH_3$, $Br_{0.2}$ | yellowish-tinged red |
| 41 | H | H | NH2 | OH | $OC_5H_{10}O$—⟨phenyl⟩—$Br_{1.1}$ | yellowish-tinged red |
| 42 | H | H | NH2 | OH | $OC_6H_{12}O$—⟨phenyl⟩—$CH_3$, $Br_{0.3}$, $CH_3$ | yellowish-tinged red |
| 43 | H | H | NH2 | OH | $O-CH_2-CH_2-CH(CH_3)-O$—⟨phenyl⟩—$Br_{0.4}$ | yellowish-tinged red |
| 44 | H | H | NH2 | OH | $O-CH_2-CH(C_2H_5)-CH_2-O$—⟨phenyl⟩—$Br_{0.5}$ | yellowish-tinged red |
| 45 | H | H | NH2 | OH | $OC_2H_4O$—⟨phenyl⟩—$Br_{1.4}$ | yellowish-tinged red |

EXAMPLE 46

5.1 g of 1-amino-2,4-dihydroxy-anthraquinone are dissolved in 40 ml of N-methylpyrrolidone, 1 g of anhydrous potassium carbonate is added and, after adding 6.5 g of brominated phenoxyethyl bromide (bromine content 48%, obtained by bromination of phenoxyethyl bromide in carbon tetrachloride) the mixture is warmed at 80° - 90° C for 1 hour. After cooling, the mixture is diluted with 80 ml of methanol, 20 ml of water and 1 ml of glacial acetic acid and the dyestuff which has separated out is filtered off. 5.2 g of the indicated compound, which has a bromine content of 7.7% and which gives fast red dyeings on polyester materials, are obtained.

EXAMPLE 47

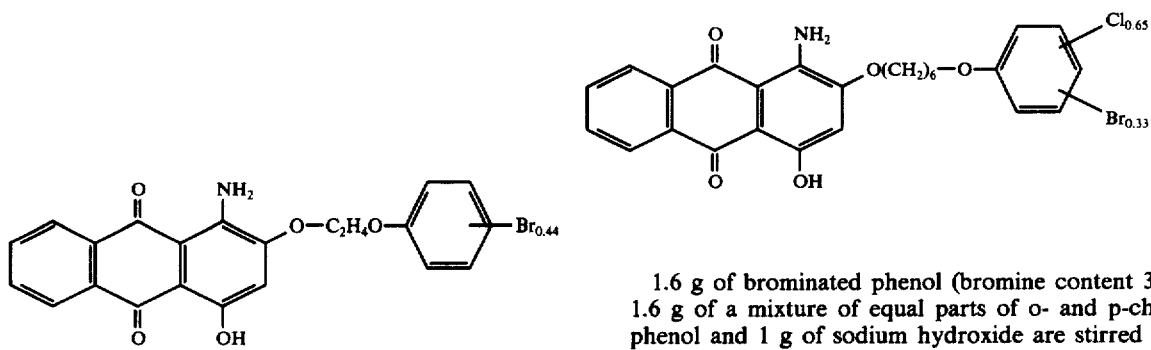

1.6 g of brominated phenol (bromine content 33%), 1.6 g of a mixture of equal parts of o- and p-chlorophenol and 1 g of sodium hydroxide are stirred for ½ hour at 40° C in 60 ml of N-methylpyrrolidone. 8.4 g of 1-amino-4-hydroxy-2-(ω-bromohexoxy)-anthraquinone are then introduced and the temperature is raised to 70° - 80° C. The mixture is stirred for 3¼ hours at this temperature and, after cooling, is diluted with 120 ml of methanol and a little glacial acetic acid. The dyestuff mixture which has separated out is filtered off, washed with methanol and water and dried. 7.8 g of dyestuff, which contains 4.2% of chlorine and 4.8% of bromine and which gives a clear red dyeing of good fastness properties on polyester fibres, are obtained.

EXAMPLE 48 a. 6 g of 1-amino-4-hydroxy-2-(2-phenoxyethoxy)-anthraquinone are suspended in 80 ml of concentrated hydrochloric acid. The reaction mixture is treated with 3 g of bromine at room temperature and stirred for 3 hours. It is then passed into 200 ml of water, 20 ml of sodium bisulphite solution are added and the precipitate is filtered off and washed until neutral. 6.8 g of a dyestuff mixture which contains 15.8% of bromine (calculated: for a monobrominated compound, 17.6%) are obtained.

b. Using 1 g of the dyestuff mixture prepared according to Example 1a, which has previously been finely dispersed in the presence of dispersing agents, 100 g of polyethylene terephthalate fibres are dyed in 4 l of water for 2 hours at 100° C and at pH 4.5 in the presence of 15 g of o-cresotic acid methyl ester as the carrier. A brilliant yellowish-tinged pink dyeing, which is distinguished by very good build-up and high fastness to washing, thermofixing, abrasion and light, is obtained. A similar dyeing is obtained when the polyester fibres used are those obtained from 1,4-bis-(hydroxymethyl)-cyclohexane and terephthalic acid.

c. Using 1 g of the dyestuff mixture mentioned in Example 1a), which has previously been finely dispersed using the customary auxiliaries, 100 g of polyester fibres (polyethylene terephthalate) are dyed in 3 l of water for 1 hour at 125° - 130° C under pressure. A clear, deep pink dyeing of good fastness properties is obtained.

d. Using 1 g of the dyestuff mixture mentioned in Example 1a), which has previously been finely dispersed by the customary methods, 100 g of polyamide fabric are dyed in 4 l of water for 1 hour at 100° C. The fabric is then rinsed warm and cold and dried. A clear pink dyeing of very good fastness to washing and light is obtained.

Polyurethane fibres can be used in place of polyamide fibres with equal success.

e. A dyebath is prepared with 1 g of the dyestuff mixture prepared according to Example 1a, which has previously been finely dispersed using the auxiliaries customary for this purpose, 6 g of fatty alcohol sulphonate and 3 l of water, and 100 g of cellulose triacetate fibres are dyed in this bath for 1 hour at 100° C. A yellowish-tinged red dyeing of very good fastness to washing, thermofixing, abrasion and light is obtained.

f. 20 g of cellulose 2½-acetate fibres are dyed for 1 hour at 75° C in a liquor consisting of 600 ml of water, 1 g of Marseille soap and 0.2 g of the dyestuff mixture mentioned in Example 1a), which has been finely dispersed. A brilliant pink dyeing with good fastness to abrasion, light and water is obtained.

EXAMPLE 49 a. 6 g of 1-amino-4-hydroxy-2-(2-phenoxyethoxy)-anthraquionone are warmed in 60 ml of glacial acetic acid together with 1.57 g of bromine for 10 minutes at 90° - 100° C. The reaction mixture is then poured into 200 ml of water to which 20 ml of sodium bisulphite solution has previously been added and the precipitate is filtered off, washed with water until neutral and dried. 6.5 g of a dyestuff which contains 9.8% of bromine are obtained.

b. 1 g of this dyestuff mixture, prepared in this way and finely dispersed, is introduced into a dyebath which contains 100 g of polyester fibres (polyethylene terephthalate) in 3 l of water. Dyeing is carried out for 1 hour at 125° - 130° C under pressure and a clear, deep yellowish-tinged red dyeing of very good fastness properties is obtained.

c. A pre-cleaned and thermofixed fabric made from polyethylene terephthalate is printed with a paste consisting of the following components: 20 g of the dyestuff prepared according to Example 2a) and finely dispersed, 520 g of water, 450 g of crystal gum 1:2 and 10 g of cresotic acid methyl ester.

An alginate thickener can also be used in place of crystal gum. In order to fix the dyestuff, the printed and dried goods are treated with hot air at 200° C or are passed, at 190° - 200° C, over a high capacity stenter frame or through a condensing apparatus. The period of action is 30 - 60 seconds. The resulting fixed print is then rinsed cold, soaped with 1 - 2 g/l of anionic washing agent for about 10 minutes at 70° - 80° C, rinsed, first hot and then cold, and dried. A clear print of very good fastness to light and sublimation is obtained.

A brilliant pink print is obtained in a similar manner when cellulose triacetate, polyamide or polyurethane fibres are employed in place of polyethylene terephthalate fibres.

EXAMPLE 50 a. 6 g of 1-amino-4-hydroxy-2-(2-phenoxyethoxy)-anthraquinone are suspended in 60 ml of concentrated hydrochloric acid. After adding 6.3 g of bromine, the reaction mixture is stirred for 12 hours at room temperature. It is then passed into a mixture of 200 ml of water and 20 ml of sodium bisulphite solution and the precipitate is filtered off and washed with water until neutral. 8 g of a dyestuff mixture which contains 25.3% of bromine (calculated: for a dibrominated compound, 29.95%) are obtained.

b. A fabric made from polyester fibres (polyethylene terephthalate) is impregnated on a padder with a liquor which contains, per liter, 20 g of the dyestuff according to Example 3a), which has previously been finely dispersed in the presence of dispersing agents. The fabric is squeezed out to an increase in weight of 70% and dried in a suspension jet drier or drying cabinet at 80° - 120° C. The fabric is then treated in a stenter frame or nozzle hot flue with hot air at 190° - 220° C for about 45 seconds, afterwards it is rinsed, possibly subjected to a reductive after-treatment, washed, rinsed and dried. The reductive after-treatment in order to remove portions of dyestuff adhering to the surface of the fibres can be carried out by introducing the fabric, at 25° C, into a liquor which contains, per liter, 3 - 5 cm³ of 38° Be strength sodium hydroxide solution and 1 - 2 g of sodium dithionite (concentrate), heating the bath to 70° C for about 15 minutes and leaving it at 70° C for a further 10 minutes. The fabric is then rinsed hot, acidified with 2 - 3 cm³/l of 85% strength formic acid at 50° C, rinsed and dried. A brilliant pink dyeing, which is distinguished by its high dyestuff yield, very good build-up and very good fastness properties, especially good fastness to thermofixing, washing, abrasion and light, is obtained.

A similar dyeing is obtained when polyester fibers obtained from 1,4-bis-(hydroxymethyl)-cyclohexane and terephthalic acid are used in place of polyethylene terephthalate fibres. A brilliant pink dyeing is obtained in a similar manner when cellulose triacetate fibers are employed in place of polyethylene terephthalate fibers and the thermosol treatment is carried out at 215° C or when polyamide or polyurethane fibers are used and the thermosol treatment is carried out at 190° – 215° C.

c. When 6 g of 1-amino-4-hydroxy-2-(2-phenoxyethoxy)-anthraquinone are dissolved, at 10° – 15° C, in 60 ml of 80% strength sulphuric acid and the reaction mixture is treated with a little iodine and 9.4 g of bromine, then stirred for 8 hours at 20° C and then treated with 56 ml of sulphuric acid monohydrate, this gives, after stirring for a further 10 hours at 20° C and after customary working up with ice and bisulphite solution, 9.8 g of a dyestuff mixture with a bromine content of 37.5% (calculated: for a tribrominated compound, 39.1%), which, when applied to polyethylene terephthalate fabric by the thermosol process according to the instructions in Example 3b), also give a deep pink dyeing with good fastness properties.

EXAMPLE 51 a. 6 g of 1-amino-4-hydroxy-2-(2-cresoxyethoxy)-anthraquinone, prepared by transetherification of 1-amino-4-hydroxy-2-phenoxy-anthraquinone with the product of the reaction of ethylene oxide with a mixture of 70% of m-cresol and 30% of p-cresol, are suspended in 60 ml of water and the suspension is treated with 1.57 g of bromine. The mixture is stirred for 1 hour at room temperature and the precipitate is filtered off, washed with water and dilute sodium bisulphite solution and dried. 6 g of a dyestuff mixture with a bromine content of 6.1% are obtained.

b. 1 g of the dyestuff mixture prepared according to Example 4a), which has previously been finely dispersed in the presence of dispersing agents, is dispersed in 400 parts of water. 100 parts of polyester fibers (polyethylene terephthalate) are dyed in the resulting dyebath for 120 minutes at the boil, in the presence of 15 parts of o-cresotic acid methyl ester as the carrier. A clear, yellowish-tinged red dyeing of good fastness properties, especially good fastness to light and sublimation, is obtained.

EXAMPLE 52 a. 30 g of 1-amino-4-hydroxy-2-(2'-phenoxyethoxy)-anthraquinone are suspended in 300 ml of methylene chloride and the suspension is treated, at room temperature, with 7.85 g of bromine. The mixture is then stirred for 2 hours at room temperature and the dyestuff which has separated out is filtered off and washed with water and sodium bisulphite solution. 28.5 g of a reaction product which contains 7.5% of bromine are obtained. If, using an otherwise identical procedure, the methylene chloride is removed by distillation, 31.5 g of a dyestuff with a bromine content of 8.0% are obtained.

b. When the bromination is carried out in the same manner as described in Example 5a) in 300 ml of chloroform, 31 g of dyestuff with a bromine content of 8.5% are obtained. If the 300 ml of methylene chloride are replaced by 300 ml of ortho-dichlorobenzene, which is removed by steam distillation after the bromination is complete, 30.1 g of a dyestuff with a bromine content of 6.6% are obtained when 6.3 g of bromine are used.

Using the dyestuffs prepared by the methods described above, deep, clear red dyeings of very good fastness properties are obtained on polyester materials using the dyeing methods mentioned in Examples 1 – 4.

EXAMPLE 53 a. 6 g of 1-amino-4-hydroxy-2-(2'-[2-isopropylphenoxy]-ethoxy)-anthraquinone are stirred in 60 ml of concentrated hydrochloric acid with 2.2 g of bromine for 1½ hours at room temperature. After working up with water and dilute sodium bisulphite solution, 6 g of a dyestuff mixture which contains 9.0% of bromine are obtained.

b. Using 1 g of this dyestuff, which has previously been finely dispersed using the customary auxiliaries, 100 g of polyester fibers (obtained by polycondensation of terephthalic acid with dimethylolcyclohexane) are dyed in 300 parts of water for 1 hour at 125° – 130° C under pressure. A clear, yellowish-tinged red dyeing of good fastness properties is obtained.

EXAMPLE 54

4 g of 1-amino-4-hydroxy-2-(2'-[3'',4''-dimethylphenoxy]-ethoxy)-anthraquinone are suspended in 40 ml of 15% strength hydrochloric acid and the suspension is stirred together with 1.57 g of bromine for 1½ hours at room temperature. After customary working up, 4.3 g of a dyestuff mixture, which contains 13.1% of bromine and which dyes polyester fibers in deep, yellowish-tinged red shades, are obtained.

EXAMPLE 55

If the starting material used in Example 7 is replaced by 5.5 g of 1-amino-4-hydroxy-2-(2'-[2'',6''-dimethylphenoxy]-ethoxy)-anthraquinone and the bromination is carried out with 2.2 g of bromine in 80 ml of concentrated hydrochloric acid, 6.1 g of a dyestuff mixture, which contains 10.5% of bromine and which dyes polyester material in deep, yellowish-tinged red, fast shades, are obtained.

EXAMPLE 56 a. 4 g of 1-amino-4-hydroxy-2-(ω-phenoxy-hexanoxy)-anthraquinone are stirred in 60 ml of concentrated hydrochloric acid with 0.63 g of bromine for 1½ hours at room temperature. The dyestuff, which is worked up in the customary manner and of which 4.1 g are obtained, contains 7.2% of bromine.

b. A fabric of polyethylene terephthalate fibres is impregnated at room temperature with a clear red solution which contains 10 g of the dyestuff according to Example 9a) and 7 g of nonylphenol heptoethylene glycol ether in 983 g of tetrachloroethylene. After squeezing out to an increase in weight of 60%, the fabric is dried for one minute at 80° C. The dyestuff is then fixed by heating the fabric at 190° – 220° C for 45 hours. The small amount of dyestuff which has not been fixed is then washed out by rinsing briefly with cold tetrachloroethylene. After drying, a clear, yellowish-tinged red dyeing, which is distinguished by a good build-up and by its good fastness properties, is obtained.

If tetrachloroethylene is replaced by the same amount of 1,1,2-trichloroethane, pentachloroethane, 1,2-dichloropropane, 2-chlorobutane, 1,4-dichlorobutane, perfluoro-n-hexane, 1,2,2-trifluorodichloroethane, trifluoro-pentachloropropane, chlorobenzene, fluorobenzene, chlorotoluene or benzotrifluoride, equivalent red dyeings are obtained.

EXAMPLE 57 a. 10 g of 1-amino-4-hydroxy-2-(2'-phenylaminoethoxy)-anthraquinone are dissolved in 80 ml of 90% strength sulphuric acid at 15° – 20° C. After adding a little iodine and 4.4 g of bromine, the reaction mixture is stirred for 8 hours at room temperature. It is then poured onto 500 g of ice, which contains 20 ml of sodium bisulphite solution, and the precipitate is filtered off and washed with water until neutral. After drying, 10.2 g of a dyestuff mixture which contains 5.0% of bromine are obtained.

b. When the same starting material is brominated in concentrated hydrochloric acid, instead of in sulphuric acid, with 5.35 g of bromine for 2 hours at room temperature, 12 g of a dyestuff which contains 17.9% of bromine are obtained.

c. Using 1 g of the dyestuff according to Example 10a or 10b, which has been finely dispersed, 100 g of polyamide fabric are passed into 4,000 ml of water for 1 hour at 100° C. The fabric is then rinsed warm and cold and dried. A clear, red dyeing of good fastness properties is obtained.

EXAMPLE 58 a. 6.28 g of bromine and a little iodine are introduced into a suspension of 6 g of 1-amino-4-hydroxy-2-(3'-phenylpropoxy)-anthraquinone in 80 ml of concentrated hydrochloric acid and the reaction mixture is stirred for 12 hours at room temperature. It is then worked up with water and sodium bisulphite solution. 6.5 g of a dyestuff mixture with a bromine content of 21.4% are obtained.

b. If the bromination is carried out in 90 ml of 80% strength sulphuric acid instead of in concentrated hydrochloric acid, 6.8 g of dyestuff containing 19.4% of bromine are obtained from 6 g of starting material.

c. 1 g of the dyestuff according to Example 11a or 11b, which has previously been finely dispersed in the presence of customary dispersing agents, is dispered in 400 ml of water. 100 parts of polyester fibers (polyethylene terephthalate) and dyed in the resulting dye bath for 120 minutes at the boil, in the presence of 15 parts of o-cresotic acid methyl ester as the carrier. A clear, yellowish-tinged red dyeing of good fastness properties, in particular good fastness to light and sublimation, is obtained.

EXAMPLE 59 a. 12 g of 1-amino-4-hydroxy-2-(2'-phenylethoxy)-anthraquinone are suspended in 120 ml of concentrated hydrochloric acid. After adding a little iodine and 6.28 g of bromine, the mixture is stirred for 65 hours at room temperature and worked up in the customary manner to give 12.8 g of dyestuff containing 13.5% of bromine.

b. Using 1 g of this dyestuff, which has previously been finely dispersed using the customary auxiliaries, 100 g of polyester fibres (polyethylene terephthalate) are passed into 3,000 ml of water for 1 hour at 125° – 130° C under pressure. A deep, yellowish-tinged red dyeing of good fastness properties is obtained.

EXAMPLE 60 – 171

When brominations are carried out in the same manner as indicated in Examples 1 – 12 with the dyestuffs indicated in the Table, dyestuff mixtures which have the indicated bromine contents and which give the indicated shades on polyester materials are obtained.

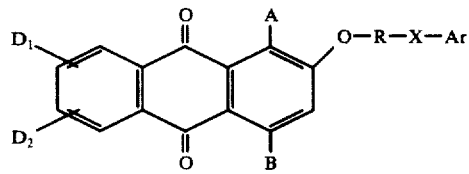

| Ex. | D1 | D2 | A | B | O—R—X—Ar | Br % | Shades on polyethylene terephthalate |
|---|---|---|---|---|---|---|---|
| 60 | H | H | NH2 | OH | OC₂H₄—⟨phenyl with CH₃⟩ | 9.2 | yellowish-tinged red |
| 61 | H | H | NH2 | OH | OC₂H₄O—⟨phenyl with CH₃⟩ | 6.5 | " |
| 62 | H | H | NH2 | OH | OC₂H₄O—⟨phenyl⟩—CH₃ | 11.4 | " |
| 63 | H | H | NH2 | OH | OC₂H₄O—⟨phenyl with C₂H₅⟩ | 7.3 | " |
| 64 | H | H | NH2 | OH | OC₂H₄O—⟨phenyl⟩—CH(CH₃)₂ | 4.2 | " |
| 65 | H | H | NH2 | OH | OC₂H₄O—⟨phenyl⟩—C₄H₉ | 8.4 | " |
| 66 | H | H | NH2 | OH | OC₂H₄O—⟨phenyl⟩—C(CH₃)₂ | 6.5 | " |

| Ex. | D1 | D2 | A | B | O—R—X—Ar | Br % | Shades on polyethylene terephthalate |
|---|---|---|---|---|---|---|---|
| 67 | H | H | NH2 | OH | OC₂H₄O—⟨⟩—C₈H₁₇ | 9.7 | " |
| 68 | H | H | NH2 | OH | OC₂H₄O—⟨⟩—⟨H⟩ | 5.8 | " |
| 69 | H | H | NH2 | OH | OC₂H₄O—⟨⟩ / ⟨H⟩ | 8.7 | " |
| 70 | H | H | NH2 | OH | OC₂H₄O—⟨⟩, CH₃, CH₃ | 7.9 | " |
| 71 | H | H | NH2 | OH | OC₂H₄O—⟨⟩—CH(CH₃)₂, CH₃ | 4.2 | " |
| 72 | H | H | NH2 | OH | OC₂H₄O—⟨⟩—CF₃ | 3.2 | " |
| 73 | H | H | NH2 | OH | OC₂H₄O—⟨⟩—Cl | 4.8 | " |
| 74 | H | H | NH2 | OH | OC₂H₄O—⟨⟩, Cl, CH₃ | 2.3 | " |
| 75 | H | H | NH2 | OH | OC₂H₄O—⟨⟩—CH₃O | 8.9 | " |
| 76 | H | H | NH2 | OH | OC₂H₄O—⟨⟩—OCH₃ | 8.2 | " |
| 77 | H | H | NH2 | OH | OC₂H₄O—⟨⟩—OC₂H₅ | 7.8 | " |
| 78 | H | H | NH2 | OH | OC₂H₄O—⟨⟩—OC₂H₄OH | 17.2 | " |
| 79 | H | H | NH2 | OH | OC₂H₄O—⟨⟩—OC₂H₄OH | 12.4 | " |
| 80 | H | H | NH2 | OH | OC₂H₄O—⟨⟩—SCH₃ | 9.3 | " |
| 81 | H | H | NH2 | OH | OC₂H₄O—⟨⟩—O—⟨⟩ | 11.8 | " |
| 82 | H | H | NH2 | OH | OC₂H₄O—⟨⟩—CH₂—⟨⟩ | 10.5 | " |

| Ex. | D1 | D2 | A | B | O—R—X—Ar | Br % | Shades on polyethylene terephthalate |
|---|---|---|---|---|---|---|---|
| 83 | H | H | NH2 | OH | OC₂H₄O—(phenyl-phenyl) | 10.8 | " |
| 84 | H | H | NH2 | OH | OC₂H₄O—(benzodioxin with C(CH₃)₂) | 6.9 | " |
| 85 | H | H | NH2 | OH | OC₂H₄O—(benzodioxole, OCH₂O) | 7.6 | " |
| 86 | H | H | NH2 | OH | OC₂H₄O—(1-naphthyl) | 4.3 | " |
| 87 | H | H | NH2 | OH | OC₂H₄O—(2-naphthyl) | 3.1 | " |
| 88 | H | H | NH2 | OH | OC₂H₄O—(dibenzofuran) | 5.9 | " |
| 89 | H | H | NH2 | OH | OC₂H₄O—(dibenzothiophene) | 4.8 | " |
| 90 | H | H | NH2 | OH | OC₂H₄O—(dibenzofuran) | 7.2 | " |
| 91 | H | H | NH2 | OH | OCH(CH₃)—CH₂O—(phenyl) | 11.3 | " |
| 92 | H | H | NH2 | OH | OCH(CH₃)—CH₂O—(phenyl)—CH₃ | 10.9 | " |
| 93 | H | H | NH2 | OH | OCH(CH₃)—CH₂O—(phenyl)—C(CH₃)₃ | 12.7 | " |
| 94 | H | H | NH2 | OH | OCH(C₂H₅)—CH₂O—(phenyl) | 6.8 | " |
| 95 | H | H | NH2 | OH | OCH(C₂H₅)—CH₂O—(phenyl)—(H cyclohexyl) | 5.8 | " |
| 96 | H | H | NH2 | OH | O(CH₂CH₂O)₂—(phenyl) | 7.3 | " |
| 97 | H | H | NH2 | OH | O(CH₂CH₂O)₃—(phenyl) | 6.5 | " |
| 98 | H | H | NH2 | OH | O(CH₂)₃O—(phenyl) | 8.8 | " |
| 99 | H | H | NH2 | OH | O(CH₂CH₂CH₂O)₂—(phenyl) | 12.1 | " |
| 100 | H | H | NH2 | OH | O(CH₂)₄O—(phenyl) | 10.6 | " |

-continued

| Ex. | D1 | D2 | A | B | O—R—X—Ar | Br % | Shades on polyethylene terephthalate |
|---|---|---|---|---|---|---|---|
| 101 | H | H | NH2 | OH | O(CH₂)₄—O—⌬—CH₃ | 4.9 | " |
| 102 | H | H | NH2 | OH | O(CH₂)₄—O—⌬(C₃H₇) | 7.3 | " |
| 103 | H | H | NH2 | OH | O(CH₂)₅—O—⌬ | 5.2 | " |
| 104 | H | H | NH2 | OH | O(CH₂)₅—O—naphthyl | 4.1 | " |
| 105 | H | H | NH2 | OH | O(CH₂)₆—O—⌬—⌬ | 7.1 | " |
| 106 | H | H | NH2 | OH | O(CH₂)₇—O—⌬—CH₃ | 3.6 | " |
| 107 | H | H | NH2 | OH | O(CH₂)₈—O—⌬ | 2.1 | " |
| 108 | H | H | NH2 | OH | O(CH₂)₉—O—⌬ | 5.6 | " |
| 109 | H | H | NH2 | OH | O(CH₂)₁₀—O—⌬ | 8.4 | " |
| 110 | H | H | NH2 | OH | O(CH₂)₄—OCH₂—⌬ | 7.3 | " |
| 111 | H | H | NH2 | OH | O(CH₂)₄—OCH₂—⌬—CH₃ | 6.7 | " |
| 112 | H | H | NH2 | OH | O(CH₂)₃—OCH₂—⌬ | 8.9 | " |
| 113 | H | H | NH2 | OH | OC₂H₄—S—⌬ | 10.1 | red |
| 114 | H | H | NH2 | OH | OC₂H₄S—⌬(CH₃) | 5.3 | red |
| 115 | H | H | NH2 | OH | —C₂H₄NH—⌬(CH₃) | 15.3 | bluish-tinged pink |
| 116 | H | H | NH2 | OH | —C₂H₄NH—⌬—CH₃ | 12.1 | " |
| 117 | H | H | NH2 | OH | —C₂H₄NH—⌬ | 9.7 | " |
| 118 | H | H | NH2 | OH | —C₂H₄N(CH₃)—⌬ | 6.3 | " |
| 119 | H | H | NH2 | OH | —C₂H₄N(CH₃)—⌬—CH₃ | 5.8 | " |
| 120 | H | H | NH2 | OH | —C₂H₄N(C₂H₅)—⌬ | 6.2 | " |

-continued

| Ex. | D1 | D2 | A | B | O—R—X—Ar | Br % | Shades on polyethylene terephthalate |
|---|---|---|---|---|---|---|---|
| 121 | H | H | NH2 | OH | —C₂H₄N(C₂H₄OH)—⟨C₆H₅⟩ | 3.8 | " |
| 122 | H | H | NH2 | OH | —CH₂CH(OH)—CH₂O—⟨C₆H₅⟩ | 5.1 | red |
| 123 | H | H | NH2 | OH | —CH₂—CH(OH)—CH₂O—⟨C₆H₄⟩—CH₃ | 10.2 | " |
| 124 | H | H | NH2 | OH | —CH₂—CH(OH)—CH₂O—⟨C₆H₄⟩—⟨C₆H₅⟩ | 7.7 | " |
| 125 | H | H | NH2 | OH | —CH₂—CH(OH)—CH₂—S—⟨C₆H₅⟩ | 6.3 | " |
| 126 | H | H | NH2 | OH | —CH₂—CH(OH)—CH₂—NH—⟨C₆H₅⟩ | 5.3 | bluish-tinged pink |
| 127 | H | H | NH2 | OH | CH₂CH(O—⟨C₆H₅⟩)—CH₂O—⟨C₆H₅⟩ | 8.2 | red |
| 128 | H | H | NH2 | OH | CH₂CH(O—⟨C₆H₅⟩)—CH₂O—⟨C₆H₄⟩—CH₃ | 11.1 | red |
| 129 | H | H | NH2 | OH | CH₂CH(O—⟨C₆H₄⟩—Br)—CH₂O—⟨C₆H₅⟩ | 14.3 | red |
| 130 | H | H | NH2 | OH | CH₂CH(O—⟨C₆H₅⟩)—CH₂OH | 7.2 | red |
| 131 | H | H | NH2 | OH | CH₂CH(CH₃)—(CH₂)₃—O—⟨C₆H₅⟩ | 6.6 | yellowish-tinged red |
| 132 | H | H | NH2 | OH | (CH₂C(CH₃)₂)₂—CH₂CH₂—O—⟨C₆H₅⟩ | 3.8 | " |
| 133 | H | H | NH2 | OH | (CH₂)₃—O—CH₂CH₂—O—⟨C₆H₅⟩ | 4.9 | " |
| 134 | Cl | H | NH2 | OH | OC₂H₄O—⟨C₆H₅⟩ | 7.9 | pink |
| 135 | 6F | H | NH2 | OH | OC₂H₄O—⟨C₆H₄⟩—CH₃ | 9.1 | " |
| 136 | 7Cl | H | NH2 | OH | OC₂H₄—⟨C₆H₅⟩ | 8.3 | " |
| 137 | 7F | H | NH2 | OH | OC₃H₆—⟨C₆H₅⟩ | 10.2 | " |
| 138 | 5Cl | H | NH2 | OH | OC₂H₄—⟨C₆H₅⟩ | 5.1 | " |
| 139 | 5Cl | H | NH2 | OH | OC₃H₆—⟨C₆H₅⟩ | 9.6 | " |
| 140 | 8Cl | H | NH2 | OH | OC₂H₄O—⟨C₆H₄⟩—CH₃ | 7.5 | " |
| 141 | 6Cl | 7Cl | NH | OH | OC₂H₄—⟨C₆H₅⟩ | 11.2 | " |

| Ex. | D1 | D2 | A | B | O—R—X—Ar | Br % | Shades on polyethylene terephthalate |
|---|---|---|---|---|---|---|---|
| 142 | 6F | 7F | NH2 | OH | OC2H4O—⟨phenyl⟩ | 8.1 | " |
| 143 | H | H | NH2 | OH | OC2H4—⟨phenyl⟩ | 3.8 | yellowish-tinged red |
| 144 | H | H | NH2 | OH | OCH2CH(⟨phenyl⟩)—O—⟨phenyl⟩ | 7.3 | " |
| 145 | H | H | NH2 | OH | OCH2CH(⟨phenyl⟩)—OCH3 | 11.2 | " |
| 146 | H | H | NH2 | NH2 | OC2H4O—⟨phenyl⟩ | 9.7 | violet |
| 147 | H | H | NH2 | NH2 | OC2H4O—⟨phenyl-CH3⟩ | 7.3 | " |
| 148 | H | H | NH2 | NH2 | OC2H4O—⟨phenyl-CH(CH3)2⟩ | 6.8 | " |
| 149 | H | H | NH2 | NH2 | OC2H4—⟨phenyl⟩ | 11.2 | " |
| 150 | H | H | NH2 | NH2 | OC2H4—⟨phenyl⟩—CH3 | 5.3 | " |
| 151 | H | H | NH2 | NH2 | OC3H6—⟨phenyl⟩ | 4.8 | " |
| 152 | H | H | NH2 | NH2 | OC3H6O—⟨phenyl⟩ | 7.9 | " |
| 153 | H | H | NH2 | NH2 | O(CH2)4O—⟨phenyl⟩ | 10.5 | " |
| 154 | H | H | NH2 | NH2 | O(CH2)5O—⟨phenyl⟩ | 7.8 | " |
| 155 | H | H | NH2 | NH2 | OCH(CH3)CH2O—⟨phenyl⟩ | 6.6 | " |
| 156 | H | H | NH2 | NH2 | O(CH2CH2O)2—⟨phenyl⟩ | 5.9 | " |
| 157 | H | H | NH2 | NH2 | OC2H4O—⟨phenyl⟩—⟨phenyl⟩ | 11.1 | " |
| 158 | H | H | OH | OH | OC2H4O—⟨phenyl⟩ | 12.8 | orange |
| 159 | H | H | OH | OH | OC2H4O—⟨phenyl-C2H5⟩ | 24.3 | " |
| 160 | H | H | OH | OH | OC2H4O—⟨phenyl-(CH3)2⟩ | 14.6 | " |

-continued

| Ex. | D1 | D2 | A | B | O—R—X—Ar | Br % | Shades on polyethylene terephthalate |
|---|---|---|---|---|---|---|---|
| 161 | H | H | OH | OH | OC$_2$H$_4$O—(2,6-dimethylphenyl) | 7.5 | " |
| 162 | H | H | OH | OH | O(CH$_2$)$_3$O—Ph | 21.6 | " |
| 163 | H | H | OH | OH | O(CH$_2$)$_4$O—Ph | 10.3 | " |
| 164 | H | H | OH | OH | O(CH$_2$)$_5$O—Ph | 6.7 | " |
| 165 | H | H | OH | OH | O(CH$_2$)$_6$O—Ph | 7.3 | " |
| 166 | H | H | OH | OH | OCH$_2$—CH(OH)CH$_2$O—Ph | 9.1 | " |
| 167 | H | H | OH | OH | OC$_2$H$_4$—Ph | 9.0 | " |
| 168 | H | H | OH | OH | OC$_2$H$_4$—Ph—C$_2$H$_4$OH | 5.8 | " |
| 169 | H | H | OH | OH | OCH$_2$—Ph—CH$_2$OH | 4.2 | " |
| 170 | H | H | OH | OH | OC$_3$H$_6$—Ph | 6.1 | " |
| 171 | H | H | OH | OH | OC$_2$H$_4$NH—Ph | 16.3 | " |

EXAMPLE 172

6 g of 1-amino-4-hydroxy-2-(2'-phenoxyethoxy)-anthraquinone are introduced into a mixture of 40 ml of water and 20 ml of concentrated aqueous hydrochloric acid and the mixture is treated with 1.89 of bromine. The reaction mixture is stirred for 6½ hours at room temperature and then diluted with 100 ml of water and the precipitate is filtered off and washed with water and dilute sodium bisulphite solution. After drying, 6.3 1 g of a dyestuff mixture, which contains 9.1% of bromine and which dyes polyester fibres in fast red shades, are obtained.

If the bromination is carried out in 60 ml of 10% strength sulphuric acid instead of in dilute hydrochloric acid, 6.1 g of a dyestuff which contains 8.3% of bromine and which also gives fast red dyeings on polyester materials are obtained.

We claim:

1. Mixtures of water-insoluble anthraquinone dyestuff of the formula

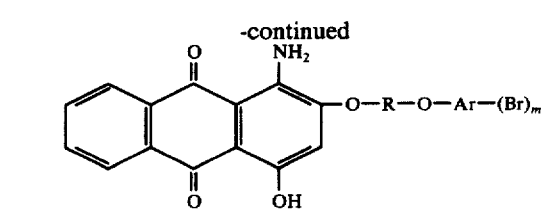

wherein
R is straight-chain C$_2$-C$_6$-alkylene;
Ar is phenyl or C$_1$-C$_2$-alkylphenyl; and
m is 0.2 to 0.8.

2. Dyestuff mixtures of claim 1 of the formula

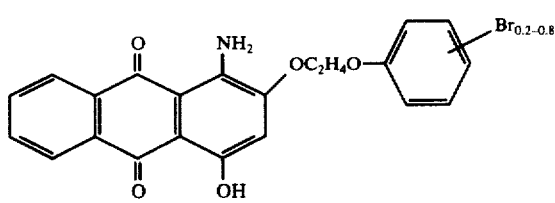

3. Dyestuff mixtures according to claim 1 of the formula

-continued
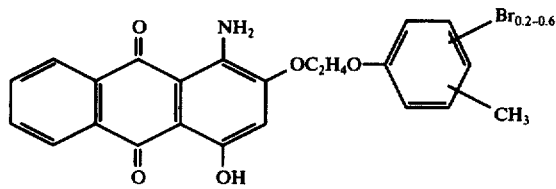
4. Dyestuff mixtures according to claim 1 of the formula
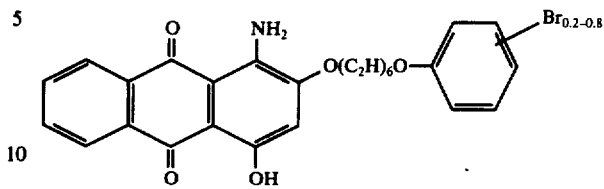
* * * * *